United States Patent
Ikeda et al.

(10) Patent No.: US 7,076,272 B2
(45) Date of Patent: Jul. 11, 2006

(54) PEN-SHAPED CELLULAR PHONE

(75) Inventors: Takeshi Ikeda, Tokyo (JP); Akira Okamoto, Saitama (JP)

(73) Assignee: Niigata Seimitsu Co., Ltd. (JP)

( * ) Notice: Subject to any disclaimer, the term of this patent is extended or adjusted under 35 U.S.C. 154(b) by 0 days.

(21) Appl. No.: 10/905,540

(22) Filed: Jan. 10, 2005

(65) Prior Publication Data

US 2005/0088349 A1    Apr. 28, 2005

Related U.S. Application Data

(63) Continuation of application No. 10/710,979, filed on Aug. 16, 2004.

(30) Foreign Application Priority Data

Aug. 28, 2003  (JP) .............................. 2003-303902

(51) Int. Cl.
    *H04M 1/00*   (2006.01)
(52) U.S. Cl. ................. 455/556.1; 455/575.1; 455/90.2
(58) Field of Classification Search ............. 455/556.1, 455/575.1, 575.6, 90.2, 66.1, 74, 350, 550.1, 455/344, 347; D14/248; 379/433.07, 369
    See application file for complete search history.

(56) References Cited

U.S. PATENT DOCUMENTS

| | | | | |
|---|---|---|---|---|
| 4,969,180 A | * | 11/1990 | Watterson et al. | 379/56.1 |
| 5,754,645 A | * | 5/1998 | Metroka et al. | 379/433.12 |
| D446,512 S | * | 8/2001 | Lee | D14/248 |
| 6,292,562 B1 | * | 9/2001 | Badarneh | 379/433.07 |
| 6,405,029 B1 | * | 6/2002 | Nilsson | 455/409 |
| 6,901,245 B1 | * | 5/2005 | Boyle | 455/90.3 |
| 2002/0065104 A1 | * | 5/2002 | Hess et al. | 455/557 |
| 2004/0229645 A1 | * | 11/2004 | Montgomery | 455/556.1 |

FOREIGN PATENT DOCUMENTS

| | | |
|---|---|---|
| JP | 04-040046 | 2/1992 |
| JP | U6-62657 | 9/1994 |
| JP | 10-224441 | 8/1998 |

* cited by examiner

*Primary Examiner*—Sonny Trinh
(74) *Attorney, Agent, or Firm*—Connolly, Bove, Lodge & Hutz, LLP (57) ABSTRACT

A keyboard section 9, whose operation keys are allocated linearly in a longitudinal direction on the cylinder chassis 1, is established except for at the location of the grip section 1a, which is held by the user when the cylinder chassis 1 is used as a writing tool. Due to this, the area of the operation keys of the keyboard section 9 can be large. And for the operation keys to be allocated linearly can preserve a great deal of space for the display section 3.

5 Claims, 4 Drawing Sheets

PEN-SHAPED CELLULAR PHONE

CROSS REFERENCE TO RELATED APPLICATIONS

This Application is a Continuation of application Ser. No. 10/710,979 filed on Aug. 16, 2004, and application Ser. No. 10/710,979 claims priority from Japanese Application 2003-303902 filed on Aug. 28, 2003. The entire contents of each of these applications is incorporated herein by reference.

BACKGROUND

This disclosure relates to a pen-shaped cellular phone that executes two-way radio communication between a wireless station and mobile object, and various aspects of this disclosure are useful as a pen-shaped cellular phone usable as an actual writing tool.

Figure 7:
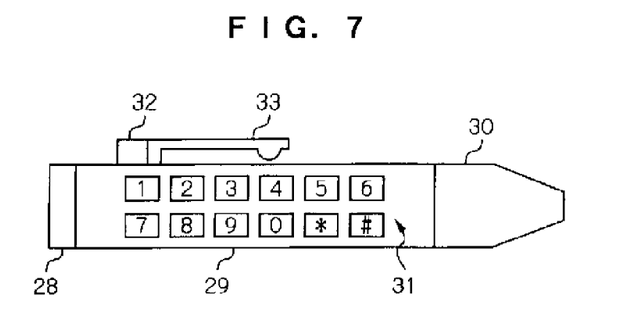
FIG. 7 is a diagram showing a conventional pen-shaped cellular phone.

Conventionally, cellular phones have become smaller and lighter, and a pen-shaped cellular phone is considered as one form of miniaturization (for example, patent document 1, etc.). FIG. 7 shows the structure of a pen-shaped cellular phone described in such patent document 1. Such pen-shaped cellular phone has a clip 33 which is doubled with a antenna, a microphone 32, a chassis upper section 29 which is equipped with an earphone 28, and a chassis lower section 30 for battery packaging. The numeric keypad 31 is allocated on the side of the chassis upper section 29. See patent document 1 (OP patent laid-open No. 4-40046).

In addition, only the numeric keypad 31 to input a phone number is allocated on the side of the pen-shaped cellular phone described in the patent document 1. According to recent cellular phones, a display section that is made of liquid crystal is essential. However, the surface area of a pen-shaped cellular phone has a limitation. When a display section becomes larger so as to cause it to provide a better view, a keyboard cannot be allocated. Thus, it is thought that operations normally performed by keyboard, such as a numeric keypad, are executed through dial-shaped inputting means (for example, patent document 2, etc.). See patent document 2 (JP patent laid-open No. 10-224441).

Figure 8:
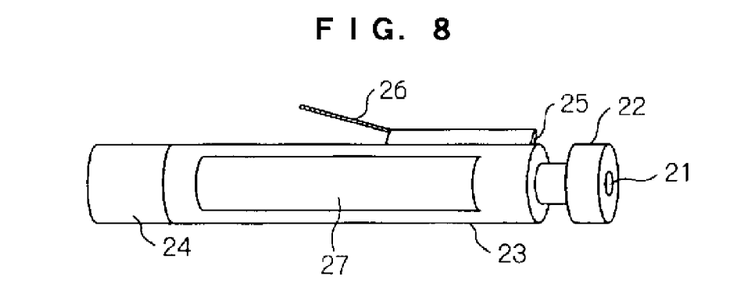
FIG. 8 is a diagram showing a conventional pen-shaped cellular phone equipped with a dial-shaped inputting section.

FIG. 8 is a diagram showing the structure of the pen-shaped cellular phone described in patent document 2. The body of such pen-shaped cellular phone has a cylindrical upper chassis 23, battery of the lower part of chassis 24, a clip section 26 which is attached to the upper chassis 23, a connecting terminal 25 for inputting and outputting such as earphone microphone jack that is set at the upper edge of a clip section 26, and an LCD (liquid crystal display) 27 for display that is attached on the side of the upper chassis 23. Furthermore, the dial-shaped inputting section 22, which has an LED 21 for calling that displays an incoming call in the center of the rotation axis, is located at the upper part of the upper chassis 23. And inputting telephone numbers and letters is performed by a dial-shaped inputting section 22.

In addition, the feature of the aforementioned pen-shaped cellular phone is a pen shape. Thus, it has not had functions as a writing tool, such as ballpoint pen or mechanical pencil. In order to allow such phone to function as a writing tool, there exists technology whereby a ballpoint pen created as a separate article, in lieu of charging battery that is set at the edge of the pen-shaped cellular phone, is connected to such phone (for example, patent document 3). See patent document 3 (JP utility model laid-open No. 6-62657).

Figure 9:
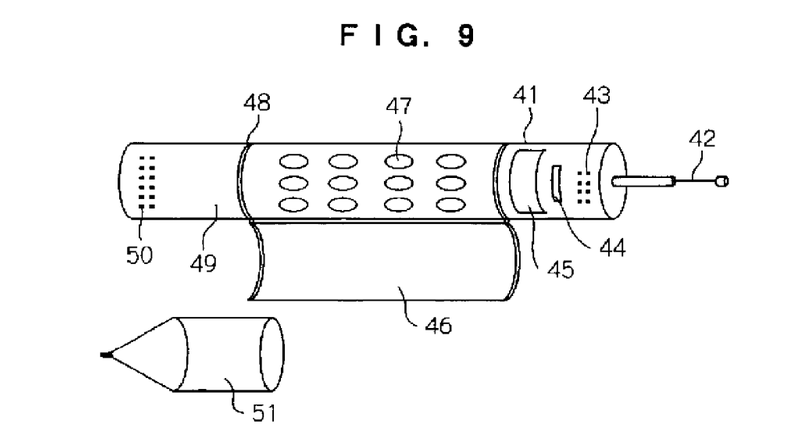
FIG. 9 is a diagram showing a conventional pen-shaped cellular phone with an edge section that is replaceable by a ballpoint pen.

FIG. 9 is a diagram of the structure of the pen-shaped cellular phone described in patent document 3. This pen-shaped cellular phone has a cylinder chassis 41, a lot antenna 42 that is mounted at the upper part of the cylinder chassis 41, a speaker 43 that is set on the side of the cylinder chassis 41, a power switch 44, a display section 45, and a lid 46 that can be opened and closed. And the part covered by the lid 46 on the side of the cylinder chassis 41 has operation keys 47. The lower part of the cylinder chassis 46 has a desorption section 48, where a battery 49 for charging is desorbed. And a microphone 50 is allocated on the side of the battery 49 for charging. Additionally, through attaching a ballpoint pen body 51 in lieu of the battery 49 for charging, the pen-shaped cellular phone can function as a writing tool.

According to the technologies described in patent document 1 mentioned above, the numeric keypad 31 is allocated in a large size at the chassis upper section 29, which is easy to operate. However, since no display section is equipped, there has been a problem whereby the operated contents by the numeric keypad 31 have not been able to be confirmed.

Additionally, according to the technologies described in the patent document 2 mentioned above, the display section 27 on the side of the upper chassis 23 is allocated in a large size, which makes it easy to confirm the operated contents. However, because keyboards are not equipped, there has been a problem whereby operations become difficult and inconvenient. That is to say, the dial-shaped inputting section 22 that is set in lieu of a keyboard is very convenient for selecting and transmitting desired telephone numbers from among the telephone numbers registered in the pen-shaped cellular phone and for selecting and transmitting telephone numbers to be redialed. However, when a telephone number is directly inputted and transmitted, or when letter strings are inputted and registered in the telephone book of the pen-shaped cellular phone, unless the method of operation is well known, such inputting operation becomes difficult and inconvenient.

Furthermore, there has been a problem where since the technologies described in the patent document 3 involve the operation keys 47 being allocated in a large size, the display section 45 becomes small, and operated contents become difficult to view. Also, while the pen-shaped cellular phone is used as a writing tool, the ballpoint pen 51 is connected in lieu of the battery 50 for charging. Thus, the power cannot be turned on and on hook/off hook cannot be executed. Thus, no outgoing or incoming calls can be made.

BRIEF SUMMARY

Various aspects of this disclosure resolve the aforementioned problems. Specifically, one aspect is to allow operation while inputted telephone numbers are being confirmed, and to make input operation easy. Also, another purpose of aspects of the disclosure is to allow to use the pen-shaped cellular phone as a writing tool, and to avoid deterioration of the function of the cellular phone even while such pen-shaped cellular phone is being used as a writing tool.

In order to solve the aforementioned problems, aspects of the disclosure have a keyboard section whose operation keys for phone calls are arranged linearly in a longitudinal direction of the surface except for the cylinder chassis pen tip section and grip section, and the display section for phone is installed linearly near such keyboard section.

So as to solve the aforementioned problems, according to various aspects of this disclosure, a keyboard section whose phone operation keys are allocated linearly, in a longitudinal direction on the surface of the cylinder chassis except for the pen tip section and the grip section.

In another aspect of disclosure, a pen-shaped cellular phone comprises a cylinder chassis having a power storage section incorporating battery to supply the power source, a switch section to perform on hook and off hook, and a display section to perform phone display. And also, a selectively mounted keyboard chassis whose phone operation keys are allocated or a chassis for writing tools whose writing component is placed at the edge thereof, at the edge of the cylinder chassis, is established. In another aspect of the disclosure, a power storage section is established in both a keyboard chassis and a chassis for writing tools.

In another aspect of the disclosure, a pen-shaped cellular phone has an integrated establishment of a first chassis having writing component at the edge thereof, a second chassis connected with the first chassis, and a keyboard section pinched by the first chassis and second chassis, where either the first chassis or the second chassis, or both thereof, can be freely slid, and an establishment of a switch section to perform on hook and off hook and a display section to perform a phone display in the first chassis or the second chassis, where due to sliding operations of one of or both of the first chassis and the second chassis, operation keys of the keyboard section can emerge therefrom or be hidden.

In another aspect of the disclosure, a pen-shaped cellular phone comprises a display section to perform a phone display, which is established in a longitudinal direction on the surface of the cylinder chassis except for at the pen tip section and the grip section, a microphone section to input numbers, letters, or codes by sounds. Also, there exist a sound recognition section to obtain information about the numbers, letters, or codes through recognizing inputted sounds from the microphone section and a switch section to perform on hook and off hook. Therefore, a combination of sounds inputting (sounds recognition) and operation switch can allow making a phone call.

In another aspect of the disclosure, a pen-shaped cellular phone comprises a plurality of rotary dials, which are allocated linearly in a longitudinal direction on the surface of the cylinder chassis except for the pen tip section and the pen grip section, each of which has 0–9 numbers and inputs numbers adjusted to a standard position as a transmissible telephone number.

Since the pen-shaped cellular phone structured as described above has a keyboard section whose operation keys for phone calls are arranged linearly in a longitudinal direction of the surface of the cylinder chassis, the display section for phone that is set along near such keyboard section. Thus, the operation keys and display section can be larger, and the display section can be easy to view and user can operate easily. And while looking at the display section, operation keys can be operated.

Also, regarding the cylinder chassis, a keyboard chassis and chassis for writing tools may be selectively attached. Thus, a large keyboard chassis can make the operation keys larger. Furthermore, since no operation keys exist on the cylinder chassis, the display section can be large. Thus, the display section can be easy to view and user can operate easily. Additionally, the power storage section is set in the cylinder chassis, and the switch section that performs on hook/off hook separately from the keyboard chassis is mounted. Thus, even when the chassis for writing tools in lieu of a keyboard chassis is mounted, the functions of the cellular phone can be used.

Also, regarding the cylinder chassis, a keyboard chassis and chassis for writing tools are selectively attached. The power storage sections are set in both thereof. Thus, when either one thereof is attached, the function of the cellular phone can be used.

Moreover, the keyboard section pinched between the first chassis and the second chasses may be structured to be stored within the sliding chassis. Thus, the operation keys can be large in accordance with the sliding width. And since no operation keys exist on the surface of the chassis, the display section of the surface can be large. Thus, the display section can be easy to view and user can operate easily. And since the switch section performing on hook/off hook is established separately from the keyboard section, even when the keyboard section is hidden, the function of the cellular phone can be used.

In addition, when numbers, letters, or codes are inputted through sounds from the microphone section, the keyboard section is unnecessary. Thus, the display section of the surface can be large and can be easy to view.

Additionally, when a plurality of rotary dials having 0–9 numbers are allocated linearly in a longitudinal direction on the surface of the cylinder chassis except for pen tip section and grip section, the number strings adjusted by the rotary dials can serve as the display of the telephone numbers, and a display section is not necessary. Even if it exists, the display section can be miniaturized so as to display the minimum requisite information. Therefore, a great deal of space can be preserved for such rotary dial, and operations can be performed easily. Additionally, when a rotary dial is large, the numbers thereof can be easy to see.

DETAILED DESCRIPTION

FIRST EMBODIMENT

Figure 1:
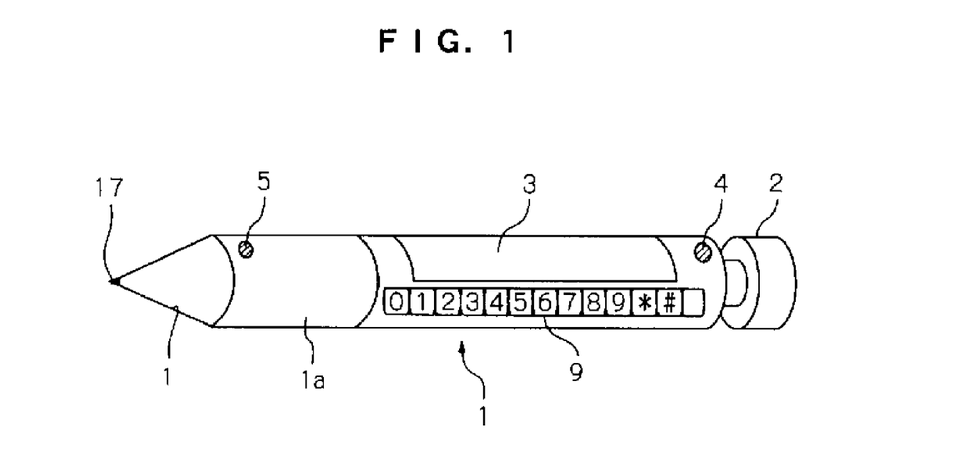
FIG. 1 is a diagram showing an example of the pen-shaped cellular phone structure of the first embodiment.

Hereinafter, the first embodiment of the present invention will be described based upon the drawings. FIG. 1 is a diagram showing an example of the exterior structure of the pen-shaped cellular phone of the first embodiment. In FIG. 1, 1 is a cylinder chassis, 1a is a grip section that is set at the edge of the chassis 1 in order for user to hold the main body, and 1b is a pen tip section whose edge is attached to the writing component 17. 2 is a dial-shaped switch section which is used for operations of on hook/off hook and redialing. 3 is a display section used to display phone information such as incoming or outgoing phone numbers. 4 is a sound output section to output call voices (hereinafter referred to as the "speaker section"). 5 is a microphone section used to input sounds of users. 9 is a keyboard section whose operation keys that are used for inputting numbers such as telephone numbers, letter strings such as the name of action addressee, and codes is allocated linearly.

As shown in FIG. 1, the pen-shaped cellular phone of this embodiment has a pen-shaped chassis which has the cylinder chassis 1, the grip section 1a set at the edge of the cylinder chassis 1, and the dwindling-shaped pen tip section 1b, which is set further towards the edge than the grip section 1a. Also, the other edge of the cylinder chassis 1 has the dial-shaped switch section 2. In addition, in this embodiment, the grip section 1a and the pen tip section 1b are combined with the cylinder chassis 1. However, such sections can be separated.

The surface of the cylinder chassis 1 has an opening section so as to mount a display section 3, speaker section 4, and keyboard section 9. Also, the grip section 1a has an opening section so as to mount a microphone section 5. Furthermore, a writing component 17 such as ballpoint pen or mechanical pencil is attached to the edge of the pen tip section 1b.

The inside of the cylinder chassis 1 has a power storage section that incorporates the battery or rechargeable battery (not illustrated) for the purpose of supplying power to the pen-shaped cellular phone. Also, the cylinder chassis 1 incorporates circuits to realize the functions as a cellular phone. In addition, the antenna (not illustrated) may be incorporated in the cylinder chassis 1 or may be established externally on the cylinder chassis 1.

The operation keys of the keyboard section 9 are allocated linearly at a position that is not the grip section 1a, which is contacted by use of fingers when the pen-shaped cellular phone of this embodiment is used as a writing tool and a user holds the cylinder chassis 1. The display section 3 is allocated near the keyboard section 9, and is allocated in a large size along with the operation keys linearly.

Next, a use example of the aforementioned pen-shaped cellular phone is explained. The keyboard section 9 is allocated so that user's fingers do not come into contact therewith, through avoiding the grip section 1a. Therefore, users hardly ever push the operation keys erroneously when the pen-shaped cellular phone of the embodiment is used as a writing tool. As such, even when the pen-shaped cellular phone is used as a writing tool, if the power of the pen-shaped cellular phone is turned on, it is in stand-by mode. Thus, incoming calls can be received.

When phone calls are received in this mode, notification of incoming calls is performed through outputting of ringtones from the speaker section 4 established in the cylinder chassis 1 or from a ringtones transmission section (not illustrated) other than the speaker section 4, display change from the display section 3 or from an incoming display section (LED, etc.) (not illustrated) other than the display section 3, or vibration of vibration means (not illustrated) incorporated in the cylinder chassis 1. At this time, on hook is performed through holding down the switch section 2 towards the direction of pen tip, or through pushing a on-hook button (not illustrated) established in the keyboard section 9. Due to this, the sounds of an intended party can be heard from the speaker section 4 and sounds can be sent to the intended party by the microphone section 5.

Alternatively, when the pen-shaped cellular phone of this embodiment is used as transmissible phone equipment, it is possible to directly input and transmit a telephone number by using the operation keys of the keyboard section 9. Also, when telephone numbers or names as a telephone book are registered in the memory means (not illustrated) established inside of the cylinder chassis 1, inputting numbers, letters, or codes can be performed by operation keys of the keyboard section 9. At this time, the operation keys of the keyboard section 9 are allocated linearly on the cylinder chassis 1, and the operation keys are not allocated on the back side of the cylinder chassis 1. Thus, when one finger operates the operation keys, other fingers can support the back side of the cylinder chassis 1. Thus, a user can accurately operate the keys without causing erroneous operation of the operation keys.

As explained above in detail, the pen-shaped cellular phone of this embodiment has the pen tip section 1b having the writing component 17 at the edge of the cylinder chassis 1. Thus, this pen-shaped cellular phone can be used as a writing tool and also as a cellular phone. Also, since the operation keys are allocated linearly, the surface area of operation keys can occupy a large area. Due to this, the operation keys can be easy to see and the user can easily perform the operations of the operation keys. Furthermore, since the operation keys are allocated linearly, a large space can be preserved for the display section 3. Due to the large size of the display section 3, the displayed contents can be easily seen. Moreover, since the display section 3 is allocated linearly near the keyboard section 9, the operation of the operation keys can be performed while the display section 3 is being viewed.

SECOND EMBODIMENT

Figure 2:
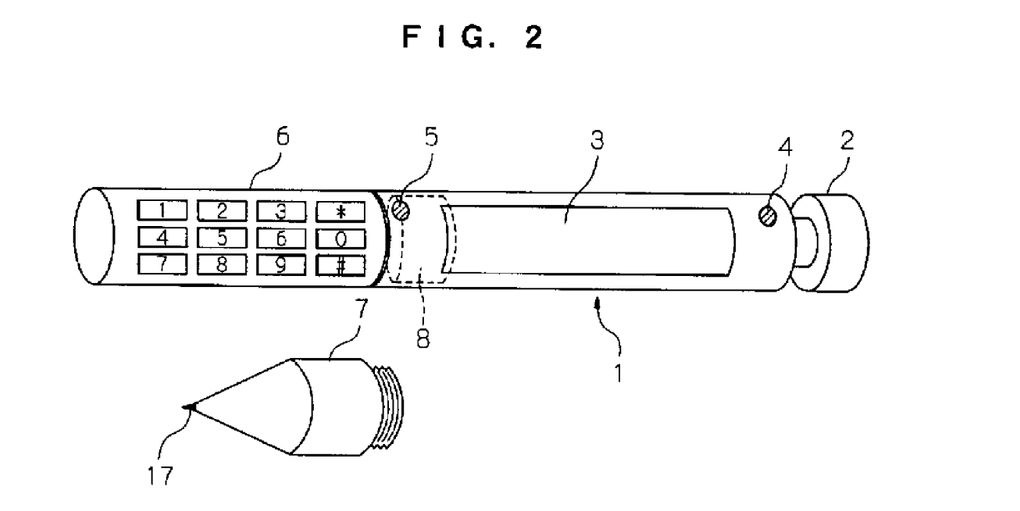
FIG. 2 is a diagram showing an example of the pen-shaped cellular phone structure of the second embodiment.

Next, the second embodiment of the pen-shaped cellular phone of the present invention will be described based upon the drawings. FIG. 2 is a diagram showing an example of the exterior structure of the pen-shaped cellular phone of the second embodiment. In FIG. 2, 1 is a cylinder chassis, 2 is a dial-shaped switch section used for the operations of on hook or off hook or redialing, 3 is a display section to display the information of incoming phone numbers and ongoing phone numbers, 4 is a speaker section to output call sounds, 5 is a microphone section to input sounds of a user, 6 is a keyboard chassis whose operation keys used for inputting numbers such as telephone numbers, letter strings such as names of action addressees, and codes are allocated on the side. 7 is a chassis for writing tools equipped with a writing component 17, such as a ballpoint pen or mechanical pencil, at the edge, and 8 is a power storage section to incorporate a power source such as a battery or a rechargeable battery.

As shown in FIG. 2, the pen-shaped cellular phone of this embodiment has an opening section to mount the display section 3, speaker section 4, and microphone section 5 on the surface of the cylinder chassis 1. Also, the dial-shaped switch section 2 is set at the edge of the cylinder chassis 1. Furthermore, the power storage section 8 incorporating battery or rechargeable battery (not illustrated) in order to supply power to the pen-shaped cellular phone is set inside the cylinder chassis 1. Moreover, the cylinder chassis 1 incorporates circuits to realize the functions of a cellular phone. In addition, the antenna (not illustrated) may be incorporated in the cylinder chassis 1 or may be established externally on the cylinder chassis 1.

The edge portion (other side of dial-shaped switch section 2) of the cylinder chassis 1 of such pen-shaped cellular phone has a freely removable keyboard chassis 6. Various methods are possible for the connection between such keyboard chassis 6 and the cylinder chassis 1: a method to physically connect via connectors established in both sides, or a method to electrically connect via radio signals in a non-contact manner.

In addition, the pen-shaped cellular phone of this embodiment can be operated as a cellular phone, even in a state where the keyboard chassis 6 is removed. And the keyboard chassis 6 can be replaced by the chassis for writing tools 7 which is separately arranged. Regarding the writing component 17 of the edge portion of the chassis for writing tools 7, a ballpoint pen, a mechanical pencil, a pencil, or a fountain pen can be applied. Therefore, the pen-shaped cellular phone of this embodiment can be used as a variety of writing tools.

Next, an example of use of the pen-shaped cellular phone mentioned above is explained. When the pen-shaped cellular phone of this embodiment is used as a writing tool, the chassis for writing tools 7 is placed at the edge portion of the cylinder chassis 1. At this time, when the power of the pen-shaped cellular phone is turned on, the pen-shaped cellular phone enters stand-by mode, and incoming calls can be received.

When phone calls are received in this mode, notification of incoming calls is performed through outputting of ringtones from the speaker section 4 established in the cylinder chassis 1 or from a ringtones transmission section (not illustrated) other than the speaker section 4, display change from the display section 3 or from an incoming display section (LED, etc.) (not illustrated) other than the display section 3, or vibration of vibration means (not illustrated) incorporated in the cylinder chassis 1. At this time, on hook is performed through holding down the switch section 2 towards the direction of the pen tip. Due to this, the sounds of an intended party can be heard from the speaker section 4 and sounds can be sent to the intended party by the microphone section 5.

Alternatively, when the pen-shaped cellular phone of this embodiment is used as transmissible phone equipment, the keyboard chassis 6 is placed at the edge of the cylinder chassis 1. At this time, it is possible to directly input and transmit a telephone number by using the operations keys of such keyboard chassis 6. Also, when telephone numbers or names as a telephone book are registered in the memory means (not illustrated) established inside of the cylinder chassis 1, inputting numbers, letters, or codes can be performed by operation keys of the keyboard chassis 6.

In addition, even in a condition where the chassis for writing tools 7 is placed at the edge of the cylinder chassis 1, for example, rotation of the dials of the switch section 2 enables transmission of telephone numbers registered in a telephone book or telephone numbers registered as redialed telephone numbers or incoming call history.

As explained above in detail, according to the pen-shaped cellular phone of this embodiment, the keyboard chassis 6 and the chassis for writing tools 7 are selectively mounted at the edge of the cylinder chassis 1. Thus, this pen-shaped cellular phone can be used as a writing tool and also as a cellular phone. Also, since the freely removable keyboard chassis 6 is structured to be comparatively large, the surface area of operation keys can be large. Due to this, the display of the operation keys can be easy to see and the user can easily operate the operation keys. Furthermore, since the keyboard chassis 6 is separated from the cylinder chassis 1, a great deal of space can be preserved in the cylinder chassis 1 for the display section 3. Thus, the display section 3 can be large and the displayed contents can be easily seen. Moreover, since the keyboard chassis 6 is removed while the pen-shaped cellular phone is used as a writing tool, no erroneous operations of the keyboard section 6 are made. Also, while the pen-shaped cellular phone is used as a writing tool, even when the keyboard section 6 is removed, there is a dial-shaped switch section 2. Thus, the main operations of a cellular phone, such as on hook and off hook, are possible.

Figure 3:
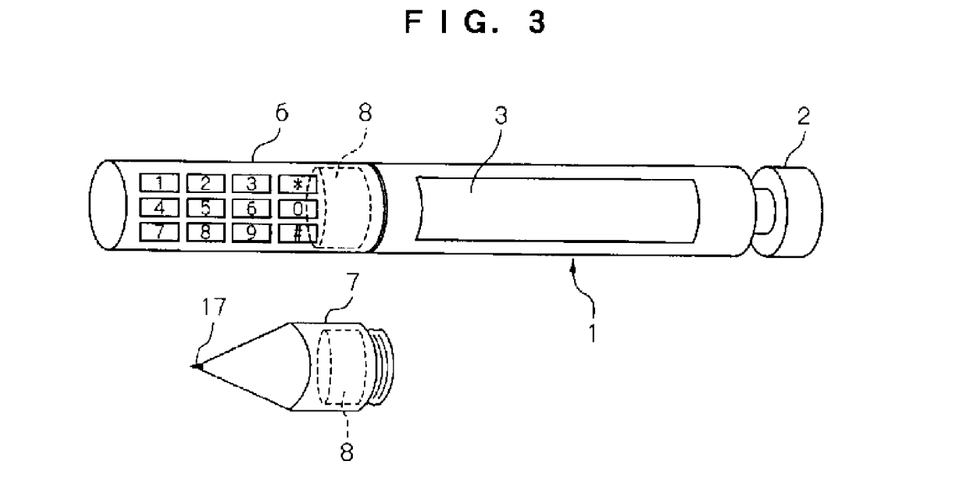
FIG. 3 is a diagram showing an example of a pen-shaped cellular phone transformation of the second embodiment.

In addition, according to the example of FIG. 2 mentioned above, the battery to supply the power is incorporated in the power storage section 8 established in the cylinder chassis 1. However, as shown in FIG. 3, the power storage section 8a is set in the keyboard chassis 6, and the power storage section 8b is set in the chassis for writing tools 7. And the power storage section 8a and 8b may incorporate batteries. According to such structure, even when the keyboard chassis 6 is placed in the cylinder chassis 1, or even when the chassis for writing tools 7 is placed therein, the power can be supplied to the inter circuits of the cylinder chassis 1, and the pen-shaped cellular phone can be used as a cellular phone. Also, the batteries are incorporated in both the keyboard chassis 6 and the chassis for writing tools 7, and can be used through exchanging them. Thus, the time until the batteries are replaced or are charged can be longer. Additionally, regarding a case where the rechargeable battery is used for the battery incorporated in the power storage section 8a and 8b, when either the chassis for writing tools 7 or the keyboard chassis 6 is placed in the cylinder chassis 1, the other can be charged by a charger that is separately established.

THIRD EMBODIMENT

Figure 4A:
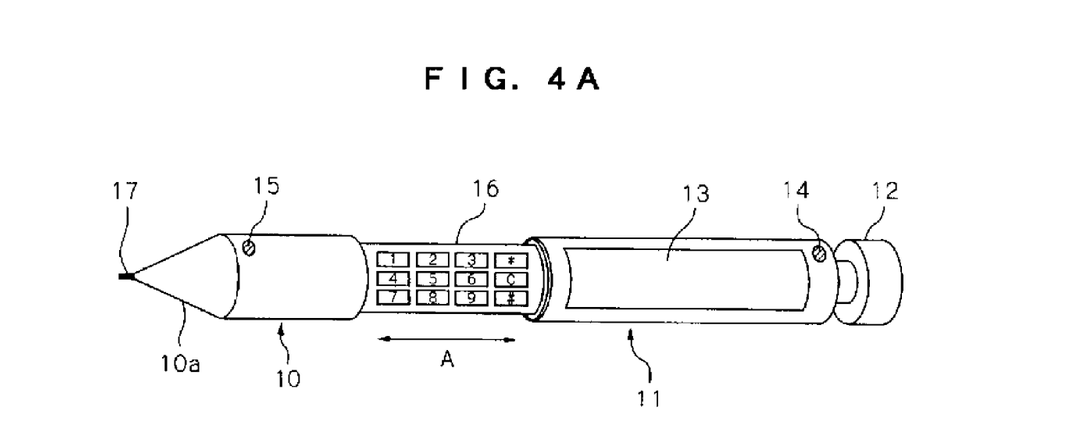
FIGS. 4A and 4B are diagrams showing an example of the pen-shaped cellular phone structure of the third embodiment.
Figure 4B:
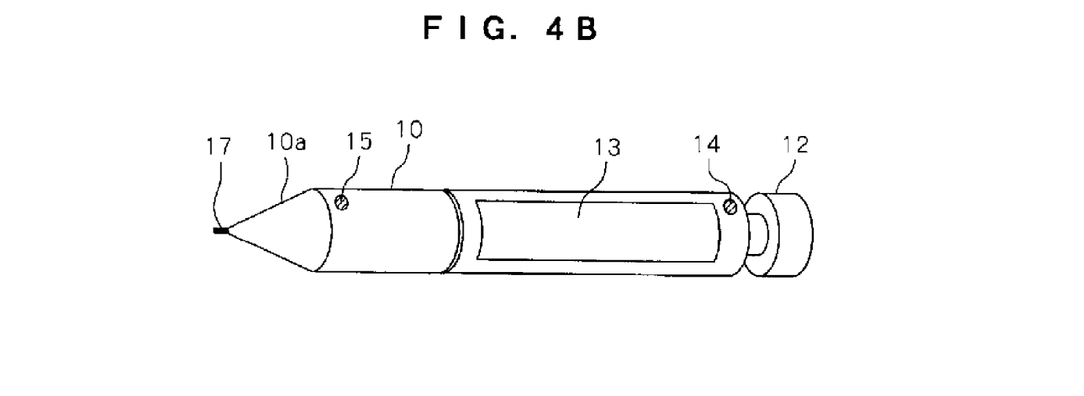

Next, the third embodiment of the pen-shaped cellular phone of the present invention will be described based upon the drawings. FIGS. 4A and 4B are diagrams showing an example of the pen-shaped cellular phone structure of the third embodiment. In FIGS. 4A and 4B, 10 is a first chassis, 10a is a dwindling-shaped pen tip section towards the edge that is established at the edge of the first chassis, 11 is a second chassis, 12 is a dial-shaped switch section to use for on hook/off hook and redialing, 13 is a display section to display phone information such as incoming phone numbers and ongoing phone numbers, 14 is a speaker section to output calling voices, 15 is a microphone section to input sounds of users, 16 is a keyboard section whose operation keys that are used for inputting numbers such as telephone numbers, letter strings such as the name of an action addressee, and codes is allocated on the side, and 17 is a writing component, such as a ballpoint pen or a mechanical pencil, established at the edge of the pen tip section 10a.

As shown in FIGS. 4A and 4B, the first chassis 10 is cylindrical and the pen tip section 10a is set at the edge thereof. Furthermore, regarding the edge portion of the pen tip section 10a, the writing component 17 such as a ballpoint pen, a mechanical pencil, a pencil, or a fountain pen can be applied. The surface of the first chassis 1 has an opening section, where the microphone section 15 is mounted in an integrated manner. Simultaneously, the second chassis 11 is also cylindrical. The edge thereof has the dial-shaped switch section 12. Also, the surface of the second chassis 11 has an opening section, where the display section 13 and the speaker section 14 are mounted in an integrated manner.

Also, the power storage section (not illustrated) that incorporates a battery or a rechargeable battery in order to supply power to the pen-shaped cellular phone is set inside the first chassis 10 or the second chassis 11. Furthermore, either the first chassis 10 or the second chassis 11, or both thereof, incorporate circuits to realize the functions of a cellular phone. In addition, the antenna (not illustrated) may be incorporated in the first chassis 10 or the second chassis 11, or may be established externally thereon.

The edge of the second chassis 11 (the opposite side of the dial-shaped switch section 12) has the keyboard section 16. A rail (not illustrated) is established on the side of such keyboard section 16 so that the first chassis 10 can slide and move towards the arrow A direction. Due to such sliding of the first chassis 10, the keyboard section 16 can be stored inside the first chassis 10 or the keyboard section 16 can be pulled from the inside of the first chassis 10.

FIG. 4A is a diagram of a state where the keyboard section 16 is pulled from the inside of the first chassis 10. And FIG. 4B is a diagram of a state where the keyboard section 16 can be stored inside the first chassis 10. Also, the amount of sliding of the first chassis 10 is optional. Due to this, the distance between the speaker section 14 established in the second chassis 11 and the microphone section 15 established in the first chassis 10 can be adjusted so that a user can easily use the pen-shaped cellular phone as a cellular phone.

Next, an example of use of the pen-shaped cellular phone mentioned above is explained. When the pen-shaped cellular phone of this embodiment is used as a writing tool, as shown in FIG. 4B, it is used in a state where the keyboard section 16 is hidden by the first chassis 10. At this time, when the power of the body is turned on, the pen-shaped cellular phone is in stand-by mode. Thus, incoming calls can be received.

When phone calls are received in this mode, notification of incoming calls is performed through outputting of ringtones from the speaker section 14 established in the second chassis 11 or from a ringtones transmission section (not illustrated) other than the speaker section 14, display change from the display section 13 or from an incoming display section (LED, etc.) (not illustrated) other than the display section 13, or vibration of vibration means (not illustrated) incorporated in the first chassis 10 or the second chassis 11. At this time, on hook is performed through holding down the switch section 12 towards the direction of the pen tip. Due to this, the sounds of an intended party can be heard from the speaker section 14 and sounds can be sent to the intended party by the microphone section 15.

Alternatively, when the pen-shaped cellular phone of this embodiment is used as transmissible phone equipment, the keyboard section 16 emerges through sliding of the first chassis 10. At this time, it is possible to directly input and transmit a telephone number by using the operation keys of the keyboard section 16. Also, when telephone numbers or names as a telephone book are registered in the memory means (not illustrated) established in the main body of the pen-shaped cellular phone, inputting numbers, letters, or codes can be performed by operation keys of the keyboard section 16.

In addition, even in a condition where the keyboard section 16 is hidden by the first chassis 10, for example, rotation of the dials of the switch section 12 enables transmission of the telephone numbers registered in a telephone book or the telephone numbers registered as redialed telephone numbers or incoming call history.

Additionally, according to the example of FIG. 4 mentioned above, the first chassis 10 is used in order to hide the keyboard section 16. However, it is not limited to this. For example, the keyboard section 16 may be fixed in the first chassis 10, and the second chassis 11 may be slid. This may allow the keyboard section 16 to be stored in the hollow portion established inside the second chassis 11. Furthermore, both the first chassis 10 and the second chassis 11 may be slid so as the keyboard section 16 to be stored inside or to be pulled.

As explained in detail above, the pen-shaped cellular phone of this embodiment has the pen tip section 10a having the writing component 17 at the edge of the cylinder first chassis 10. Thus, this pen-shaped cellular phone can be used as a writing tool and also as a cellular phone. Also, due to the large sliding width of the first chassis 10 and the second chassis 11, the keyboard section 16 can be large. Thus, the display of the operation keys can be easily seen and the user can easily operate the operation keys. Furthermore, since the operation keys are not allocated on the surface of the second chassis 11, a great deal of space can be preserved for the display section 13. Due to the large size of the display section 13, the displayed contents can be easily seen. Moreover, the keyboard section 16 is storable in the first chassis 10 or the second chassis 11. Due to this, user does not operate the operation keys of the keyboard section 16 erroneously even when the pen-shaped cellular phone is used as a writing tool. Also, a dial-shaped switch section 12 is separately established. Thus, even while the keyboard section 16 is stored and the pen-shaped cellular phone is used as a writing tool, the main operations of a cellular phone, such as on hook/off hook, are possible.

FOURTH EMBODIMENT

Figure 5:
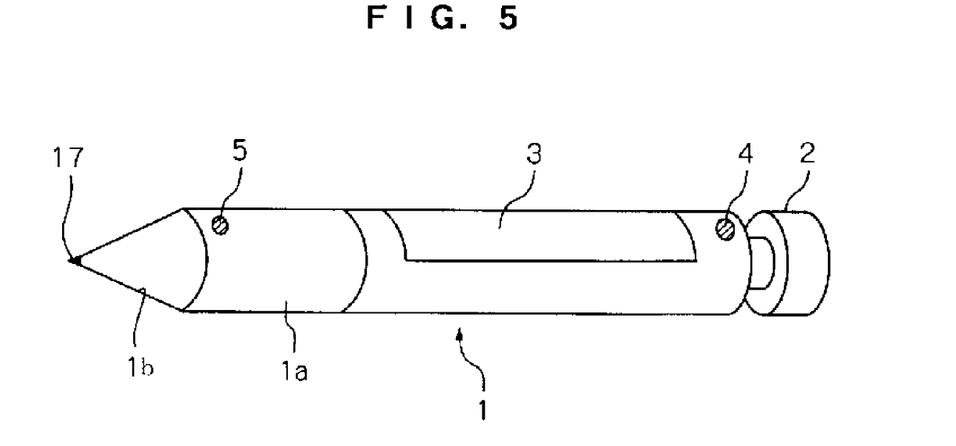
FIG. 5 is a diagram showing an example of the pen-shaped cellular phone structure of the fourth embodiment.

Hereinafter, the fourth embodiment of the present invention will be described based upon the drawings. FIG. 5 is a diagram showing an example of the exterior structure of the pen-shaped cellular phone of the fourth embodiment. In FIG. 5, the same designations shown in FIG. 1 have the same functions as those of FIG. 1. Thus, overlapping explanations are omitted here.

In this embodiment, no operation keys used for inputting numbers such as telephone numbers are established. The numbers such as telephone numbers are inputted by sounds through the microphone section 5. The power storage section incorporating a battery or a rechargeable battery (not illustrated) in order to supply power to the pen-shaped cellular phone is set inside the cylinder chassis 1. Also, the cylinder chassis 1 incorporates circuits to realize the functions of a cellular phone. Such circuits include circuits to recognize the sounds inputted from the microphone section 5 and to establish the corresponding numeric strings as a transmissible telephone number.

Next, an example of use of the pen-shaped cellular phone mentioned above is explained. No operation keys are established in the chassis 1. So no erroneous entry of the operation keys occurs at all when the pen-shaped cellular phone of this embodiment is used as a writing tool. As such, even when the pen-shaped cellular phone is used as a writing tool, if the power of pen-shaped cellular phone is turned on, it is in stand-by mode. Thus, incoming calls can be received.

When phone calls are received in this mode, notification of incoming calls is performed through outputting of ringtones from the speaker section 4 established in the cylinder chassis 1 or from a ringtones transmission section (not illustrated) other than the speaker section 4, display change from the display section 3 or from an incoming display section (LED, etc.) (not illustrated) other than the display section 3, or vibration of vibration means (not illustrated) incorporated in the cylinder chassis 1. At this time, on hook is performed through holding down the switch section 2 towards the direction of the pen tip, or through pushing an on-hook button (not illustrated) established in the chassis 1.

Due to this, the sounds of an intended party can be heard from the speaker section 4 and sounds can be sent to the intended party by the microphone section 5.

Alternatively, when the pen-shaped cellular phone of this embodiment is used as transmissible phone equipment, the telephone numbers are inputted by sounds from the microphone section 5. After this, transmission is possible through holding the switch section 2 towards the pen tip direction, for example. At this time, the inputted sounds are recognized by the inner circuits, and recognized information is displayed at the display section 3.

As explained above in detail, the pen-shaped cellular phone of the fourth embodiment has the pen tip section 1b having the writing component 17 at the edge of the cylinder chassis 1. Thus, the pen-shaped cellular phone can be used as a writing too and also as a cellular phone. Also, inputting of telephone numbers is performed by the microphone section 5 through sounds and information set is performed through sound recognition. Thus, no operation keys are necessary. A great deal of space can be preserved for the display section 3. Due to the large size of the display section 3, the displayed contents can be easily seen.

In addition, an example of inputting telephone numbers from the microphone section 5 is explained. However, this embodiment is not restricted thereto. When telephones numbers or names as a telephone book are registered in the memory means (not illustrated) established in the inner section of the cylinder chassis 1, inputting numbers, letters, or codes can be performed through sound inputting of the microphone section 5. Also, when inputted contents are corrected or operations of ongoing or incoming calls are performed, the predominated order commands can be inputted by the microphone section 5 and the commands can be executed through recognition of such inputted sounds.

FIFTH EMBODIMENT

Figure 6:
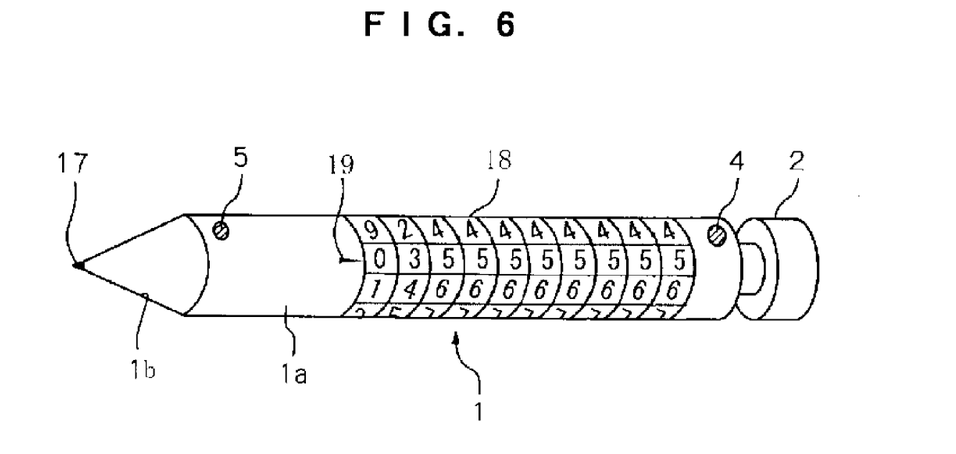
FIG. 6 is a diagram showing an example of the pen-shaped cellular phone structure of the fifth embodiment.

Hereinafter, the fifth embodiment of the present invention will be described based upon the drawings. FIG. 6 is a diagram showing an example of the exterior structure of the pen-shaped cellular phone of the fifth embodiment. In FIG. 6, the same designations shown in FIG. 1 have the same functions as those of FIG. 1. Thus, overlapping explanations are omitted here.

In this embodiment, no display section is established so as to display telephone information such as transmissible telephone numbers. No operation keys used for inputting numbers such as telephone numbers are established, either. A plurality of rotary dials 18 are established in lieu of operation keys. Inputting of the numbers such as telephone numbers can be conducted through the operation of the plurality of rotary dials 18.

Ten rotary dials 18 are established according to the 10 digits of telephone numbers. They are allocated linearly in a longitudinal direction on the surface of the cylinder chassis 1. Each dial has 0–9 numbers, and through adjusting each dial number to the standard position 19, the 10 numbers lines adjusted to the standard position 19 can be inputted as telephone numbers.

Next, an example of use of the pen-shaped cellular phone mentioned above is explained. The rotary dials 18 are allocated in a manner avoiding the grip section 1a so that a user's fingers will not come into contact therewith. Thus, when the pen-shaped cellular phone of this embodiment is used as a writing tool, users hardly ever operate the rotary dials 18 erroneously. As such, even when the pen-shaped cellular phone is used as a writing tool, if the power of the pen-shaped cellular phone is turned on, it is in stand-by mode. Thus, incoming calls can be received.

When phone calls are received in this mode, notification of incoming calls is performed through outputting of ringtones from the speaker section 4 established in the cylinder chassis 1 or from a ringtones transmission section (not illustrated) other than the speaker section 4, display change from the display section 3 or from an incoming display section (LED, etc.) (not illustrated) other than the display section 3, or vibration of vibration means (not illustrated) incorporated in the cylinder chassis 1. At this time, on hook is performed through holding down the switch section 2 toward the direction of the pen tip, or through pushing an on-hook button (not illustrated) established in the chassis 1. Due to this, the sounds of an intended party can be heard from the speaker section 4 and sounds can be sent to the intended party by the microphone section 5.

Alternatively, when the pen-shaped cellular phone of this embodiment is used as transmissible phone equipment, it is possible to directly input and transmit telephone numbers by using the rotary dials 18. Also, when 10 rotary dials 18 are adjusted to the desired number in advance, calls can be made through only on hook operation of the switch section 2. This is to say, a telephone number composed of numeric strings adjusted by the 10 rotary dials 18 can be used for abbreviated dialing.

As explained above in detail, the pen-shaped cellular phone of this embodiment has the pen tip section 1b having the writing component 17 at the edge of the cylinder chassis 1. Thus, the pen-shaped cellular phone can be used as a writing tool and also as a cellular phone. Also, there are 10 rotary dials 18 established according to the 10 digits of telephone numbers. Thus, the numeric strings adjusted by the rotary dials 18 provide a display of a telephone number. Therefore, no display section is necessary, or even if one exists, it can be miniaturized so as to display the required minimum information. Thus, a great deal of space can be preserved for the rotary dials 18, and easy operation is possible. Also, due to the large size of the rotary dials 18, the numbers thereof can be easily seen.

As such, the above the first through the fifth embodiments explained above have shown only one example of the possible incarnations upon implementing the present invention. This should not cause the technical scope of the present invention to be restrictively interpreted. That is to say, the present invention can be implemented in various forms, without deviating from the spirit or the main characteristics thereof.

What is claimed as new and desired to be protected by Letters Patent of the United States is:

1. A pen-shaped cellular phone, comprising:
  a cylinder chassis, having a power storage section incorporating battery to supply the power source, a switch section to perform on hook and off hook, and a display section to perform phone display;
  a keyboard chassis whose phone operation keys to input numbers, letters, or codes are allocated on the surface thereof; and
  a chassis for writing tools whose writing component is placed at the edge thereof;
  wherein said mounted keyboard and said chassis for writing are selectively mounted at the edge of said cylinder chassis.

2. A pen-shaped cellular phone, comprising:
  a cylinder chassis having a switch section to perform on hook and off hook and a display section to perform a phone display;

a keyboard chassis whose phone operation keys to input numbers, letters, or codes are allocated on the surface, and which has a power storage section incorporating a battery to supply the power source; and a chassis for writing tools whose writing component is placed at the edge thereof, and which has a power storage section incorporating a battery to supply the power source;

wherein said mounted keyboard and said chassis for writing are selectively mounted at the edge of said cylinder chassis.

3. A pen-shaped cellular phone, comprising:

a first chassis having writing component at the edge thereof;

a second chassis connected with said first chassis;

a keyboard section whose phone operation keys to input numbers, letters, or codes are allocated on the surface thereof pinched by said first chassis and said second chassis, where either said first chassis or said second chassis, or both thereof, can be freely slid;

a switch section to perform on book and off hook; and a display section to perform a phone display;

wherein said first chassis, said second chassis and said keyboard section are established in an integrated manner;

wherein said switch section and said display section are established in said first chassis or said second chassis; and wherein due to sliding operations of one of or both of said first chassis and said second chassis, operation keys of said keyboard section can emerge therefrom or be hidden.

4. The pen-shaped cellular phone according to claim 3, wherein a sound output section to output call voices of an intended party and a microphone section to input sounds that are transmitted to said intended party are established in different chasses.

5. A pen-shaped cellular phone, comprising:

a pen tip section, which is established at the edge of a cylinder chassis, having writing component at the edge;

a grip section held by a user used as a writing tool, which is established at the side of said pen tip section of said cylinder chassis; and a plurality of rotary dials, which axe allocated linearly in a longitudinal direction on the surface of said cylinder chassis except for said pen tip section and said pen grip section, each of which has 0–9 numbers and inputs numbers adjusted to a standard position.

* * * * *